INVENTOR.
KAI CHU

Sept. 5, 1967 KAI CHU 3,340,468
MAGNETIC METAL DETECTOR UTILIZING A MAGNETIC BRIDGE FORMED
WITH PERMANENT MAGNETS AND A HALL EFFECT SENSOR
Filed June 23, 1964 2 Sheets-Sheet 2

INVENTOR.
KAI CHU
BY
*Gerd L. Mehlhoff*
ATTORNEY

006 # United States Patent Office 3,340,468
Patented Sept. 5, 1967

3,340,468
MAGNETIC METAL DETECTOR UTILIZING A MAGNETIC BRIDGE FORMED WITH PERMANENT MAGNETS AND A HALL EFFECT SENSOR
Kai Chu, La Habra, Calif., assignor to Beckman Instruments, Inc., a corporation of California
Filed June 23, 1964, Ser. No. 377,248
3 Claims. (Cl. 324—41)

ABSTRACT OF THE DISCLOSURE

A magnetic metal detector including a magnetic bridge circuit having two magnetic loops each including a common magnetic flux path in which there is mounted a Hall voltage generator, one of the magnetic loops includes an air gap having a flux field induced thereacross. Means, associated with the air gap, cause the effective flux field through the air gap to take a more circuitous path than would otherwise be the case.

The present invention relates to apparatus for detecting the presence of magnetic materials and more particularly to apparatus using a Hall effect generating device for sensing changes in magnetic fields due to the presence of a body of magnetic material.

At times, especially in the construction industry, it is desirable to locate the position of magnetic bodies, such as pipes, rods, or conduits which are buried in concrete or in the earth, covered by wood, or otherwise hidden. In some instances, it is also desirable to determine the particular orientation of rods, pipes, conduits or other magnetic bodies before attempting to uncover them. Various types of magnetic pointers and electrical field detection devices have been devised in the past. However, most of these devices have been unwieldy and of low sensitivity. Many of the devices merely indicate the presence of a magnetic member and have no means for directly pointing out the particular orientation of the rod or pipe in its buried location.

The presence of a magnetic member in the vicinity of a magnetic field generating device or magnet can change the characteristics of the field and increase or decrease the magnetic field strength in portions of the magnetic circuit depending upon the shape of the magnetic member. A Hall effect device may be utilized to detect changes in field strength within a magnetic circuit due to the presence of a magnetic body or material in the flux field generated by a magnet or solenoid.

While all metals exhibit Hall effect to some extent when subjected to a magnetic field, certain semiconductors such as indium arsenide and indium antimonide exhibit greater Hall effect characteristics and are extremely sensitive to changes in magnetic field. The application of a magnetic flux field in a transverse direction across a Hall effect generator formed of a thin plate or film of such semiconductor material produces a deflection of a control current through such film or plate which is normal to both the applied field and to the current flow. This deflection of current creates a difference in potential or Hall voltage which appears across the opposite edges of the plate and which is proportional to the product of the current and magnetic flux. Changes in the magnetic flux field due to the presence of a magnetic material or body in the vicinity of the magnetic circuit may be reflected in the voltage output of the Hall plate or generator.

A magnetic detector using a Hall effect generating device for sensing changes in magnetic fields due to the presence of a body of magnetic material is disclosed in the invention of the application of In Whan Ha, Ser. No. 377,235, filed concurrently with the present application, and assigned to the same assignee as the present application. The present invention is an improvement over the In Whan Ha invention, which invention was made by the said In Whan Ha prior to the present invention. There is no intention in this application to claim as the present invention anything shown or described in the said In Whan Ha application.

It is an object of the present invention to provide an improved magnetic material detector using a Hall voltage generator and producing a flux field that is concentrated at greater distances from the magnetic source than known types of magnetic field responsive devices and, consequently, of greater sensitivity than known devices.

Further objects and advantages of the invention will become apparent as the following description proceeds, and the features of novelty which characterize the invention will be pointed out with particularity in the claims annexed to and forming a part of this specification.

In carrying out the objects of the present invention in accordance with one important aspect thereof, there is provided a magnetic bridge circuitry in the form of a plurality of magnetically permeable bar members arranged in first and second magnetic loops each including as a part thereof a common path or core through which the normal flux field of the respective loops is substantially equal in magnitude and opposite in direction thereby making the normal effective flux field in the common path substantially equal to zero. A Hall voltage generator is positioned in the common path of the magnetic bridge circuit and means are provided for applying a control current to the Hall generator and voltage indicating means are connected across the output of the Hall terminal of the generator. The first loop is substantially closed, while the second loop includes at least two bar members having, respectively, north and south poles terminating adjacent a substantial air gap. Within the gap of the second loop is positioned a magnet member having north and south poles thereof arranged respectively adjacent the north and south poles of the bar members of the second loop thereby causing the effective flux field through the air gap to take a more circuitous path from one pole to the other of the second loop than would be the case in the absence of the magnet member. When the gap of the second loop is disposed in the vicinity of a body of magnetic material, there is a reduction in the reluctance of the second magnetic loop and a corresponding increase in the flux magnitude through the common path of the bridge circuitry thereby causing a voltage output across the Hall voltage terminals which is applied to a suitable voltage indicating device.

For a better understanding of the invention, reference may be had to the accompanying drawings in which.

Figure 1:
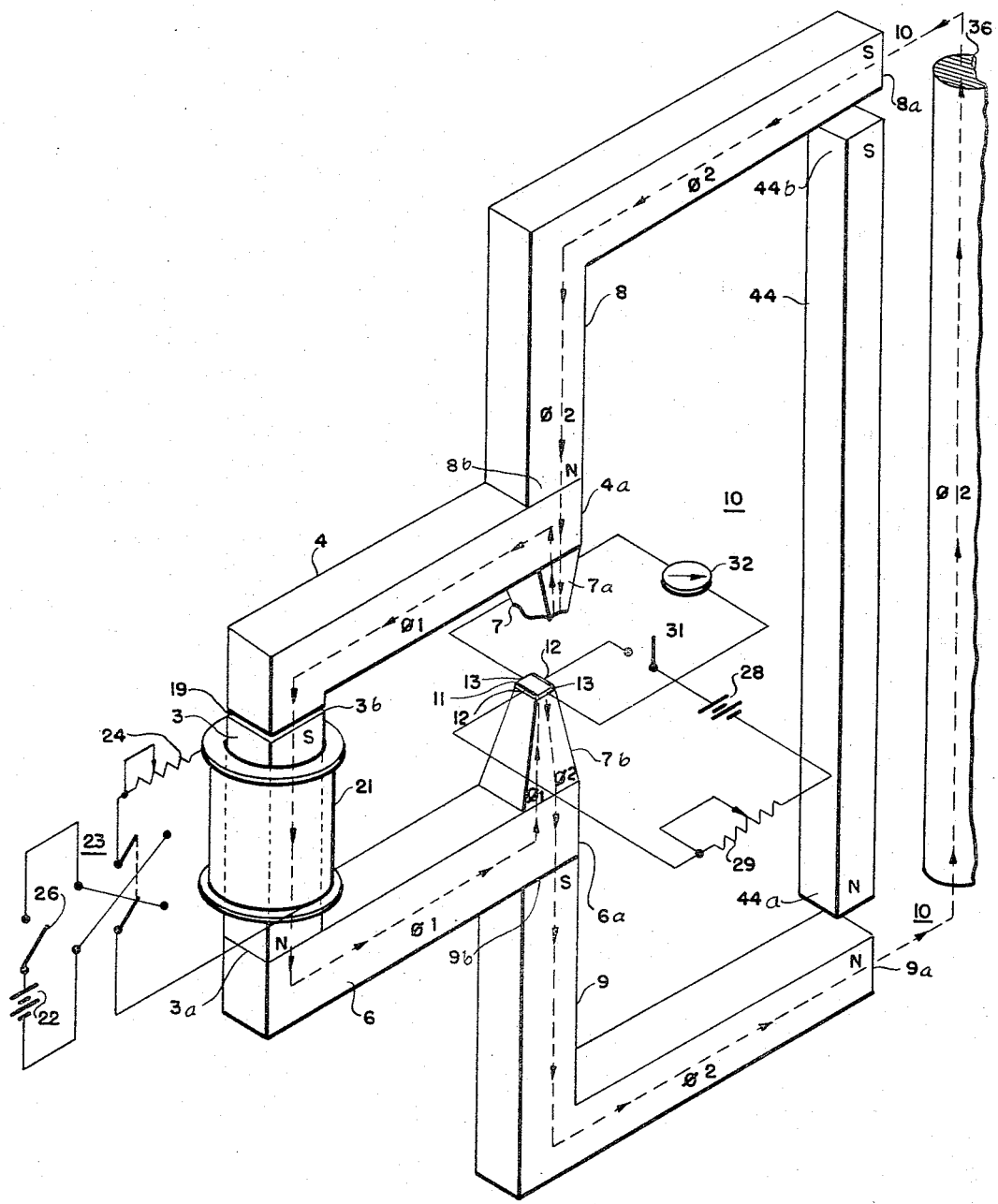
FIG. 1 is a perspective view of the magnetic bridge circuit and the associated electrical circuitry of one embodiment of the invention.

Referring now to FIG. 1, there is shown a preferred form of the detector comprising a magnetic bridge circuit including a first magnetic loop or circuit that is substantially closed and a second magnetic loop or circuit having a substantial gap or space between opposite pole faces thereof. The first loop, in FIG. 1, includes the permanent magnet member 3, having north and south poles 3a and 3b arranged on its oposite respective ends thereof, and bar members or legs 4 and 6 which may be composed of a soft magnetic material exhibiting qualities of low retentivity together with high permeability. Legs 4 and 6 of the first or substantially closed magnetic loop provide a path for the magnetic flux created by the permanent magnet 3 and connect respectively with a common core or common path, generally designated by the reference numeral 7, of soft, high permeability magnetic material, which forms a common path between the first and second magnetic loops. The common core 7 includes a pair of tapered sections 7a and 7b of soft, high magnetically permeable material the shape of which serves to concentrate the flux field through the common path or common core 7 of the respective magnetic bridge loops.

The second magnetic loop or circuit includes the common path or core 7 and a pair of L-shaped bar members or legs 8 and 9 abutting respectively the legs 4 and 6 of the first magnetic circuit and directly in alignment with the common core 7. In the preferred embodiment, legs 8 and 9 are permanent magnets having north and south pole faces respectively in alignment with the common core 7. The remaining portion of the second loop includes a gap 10 disposed between or bridging opposite ends or poles 8a and 9a respectively of the magnet members 8 and 9. Within the gap 10, there is positioned a magnetic member or bar 44 adapted to cause the flux field across the air gap to assume a more circuitous path, as will be explained later in the specification. Permanent magnets 3, 8 and 9 must have a high resistance to demagnetization as well as a strong coercive force, so a magnet formed of a material, such as the well-known Alnico magnetic alloys which strongly resist demagnetization, may be employed.

Arranged within a small gap between the tapered sections 7a and 7b in the common core 7 is a Hall generator 11 which is arranged substantially normal to the flux path in core 7. Hall generator 11 comprises a thin film of semiconductor material, such as indium antimonide (InSb) or indium arsenide (InAs), vacuum deposited on a slab of ferrite or other suitable substrate material. Hall generator or plate 11 is provided with a pair of input terminals 12 and Hall voltage output terminals 13 connected respectively to opposite sides of the semiconductor film deposited on the substrate. Preferably the Hall generator may be formed of any of the well-known semi-conductor materials, such as indium antimonide or indium arsenide in the form of a thin film deposit of semiconductor material on a nonconductive base plate or ferrite plate according to the methods set forth in the French et al. Patent No. 3,084,124, issued Mar. 19, 1963, and assigned to the same assignee as the present invention.

As will be seen in FIG. 1, permanent magnet 3 produces a magnetic flux, represented by the dotted lines $\phi 1$ in a closed loop from north pole 3a, through member 6, the common core 7, member 4 to the south pole and 3b of permanent magnet 3. Flux field $\phi 1$ is directed in the upward direction through the common core 7 and through the Hall plate 11 disposed therein. Magnetic members 8 and 9 produce a flux $\phi 2$ in the common core 7 which is opposite in direction and of substantially the same magnitude as flux $\phi 1$. Because of the gap 10 in the second or open magnetic circuit, magnets 8 and 9 must be of substantially greater strength than magnet 3 in order to provide a flux field of substantially the same magnitude as flux field $\phi 1$ through the common core 7 of the magnetic bridge. Flux field $\phi 2$ is also applied through the Hall generator 11 and is illustrated by the dotted lines and arrows designated $\phi 2$ represented in the second magnetic loop.

Most of flux field $\phi 1$ generated by magnet 3 passes through the central core 7 rather than through the second loop formed by the magnetic members 8 and 9 and gap 10 because the reluctance of gap 10 is much larger in comparison to the reluctance of the gap in core 7 for the Hall generator 11. Similarly, most of the flux field $\phi 2$ passes through the common core 7 because of the reluctance of the central or common core 7 is substantially less than the reluctance through the legs 4 and 6 and magnet 3 of the first or substantially closed loop. It will be noted that the first loop is preferably provided with a gap 19 which increases the reluctance through this loop to a magnitude greater than the reluctance through the common core 7. That is, the air gap 19 in the first loop is greater than the gap provided in the central core 7 for the Hall effect element 11 and, therefore, most of the flux field produced by magnets 8 and 9 passes through the common core 7 rather than following the path around the other portions of the first loop.

The two magnetic circuits are designed so that flux fields $\phi 1$ and $\phi 2$ through the central core 7 are substantially equal in magnitude but opposite in direction and, thus, oppose and cancel each other in the central core 7. By varying the width of the gap 19 during construction of the device, a rough zeroing of the flux through the Hall generator may be realized. It is also desirable to provide means for making fine adjustments in the flux field $\phi 1$ in order to mabe it more closely equal but in opposite direction to flux field $\phi 2$. For this purpose, means are provided for increasing or decreasing the magnetic flux in the first magnetic loop. In the illustrated embodiment of FIG. 1, these means comprise a D.C. winding or coil 21 which may be connected in series across a battery 22 through a reversing switch 23 and a variable resistance device 24. A switch 26 is designed to complete the circuit through the coil 21. Reversing switch 23 makes it possible to add or subtract the ampere turns of the coil 21 in order to add or subtract magnetic flux to the magnetic loop. The variable resistor 24 provides fine adjustment for increasing or decreasing the current through the coil 21 thereby permitting precise adjustment of the ampere turns of the coil 21 to add or subtract from the flux field $\phi 1$ through the first loop thereby to make it exactly equal in magnitude to the flux $\phi 2$ in the second loop so that the normal net flux field through the common core 7 is zero.

Means are provided for applying a control current across the input electrode 12 of the Hall generator 11. In the illustrated embodiment shown in FIG. 1, these means comprise a battery 28 arranged in series with a variable resistance device 29 and a switch 31 connecting with opposite sides or terminals 12 of the Hall generator. Closing switch 31 allows control current to flow through the Hall generator and the magnitude of this current may be controlled by varying the resistance of the circuit through the variable resistance device 29.

Means, connected to the Hall output terminals 13 of the Hall generator 11, are provided for detecting any voltage across the Hall plate. While many voltage detection devices may be employed for this purpose, it is preferable to provide an indicating means which gives an output signal that is proportional to the magnitude of Hall voltage output of the generator 11. In FIG. 1, meter 32 is designed to measure the magnitude of the output voltage across the Hall generator and so indicate the magnitude with a suitable pointer.

As previously stated, under normal circumstances when the apparatus is not disposed closely adjacent any strong external field or highly permeable material, the net flux field in the common core 7 is designed to be essentially zero. This, of course, can be adjusted to zero by means of the aforedescribed fine adjustment means controlling the flux $\phi 1$ through the first loop. When the effective flux field through the common core 7 is zero, the voltage output of the Hall generator 11 is zero since the output of a Hall device is proportional to the product of the applied control current and the applied magnetic flux field across the Hall plate. When a body of iron or other magnetic material, such as the rod 36, is disposed in the vicinity of the gap 10 of the magnetic bridge circuit, the body provides a path of reduced magnetic reluctance for the flux field generated by magnetic members 8 and 9 and greatly increases the magnetic flux field $\phi 2$ in this loop. The first or closed loop of the magnetic bridge is virtually unaffected by the magnetic material because this branch is already closed magnetically with a much smaller air gap 19 than that of the second loop. A difference between the respective fluxes φ1 and φ2 will appear, and the difference will, of course, create a new magnetic field through the Hall generator 11. This net field is dependent upon the depth, permeability, size and state of magnetization of the magnetic body or other material detected. The Hall generator 11 then generates a voltage output that is proportional to the control current applied and the increased or changed flux field (φ1–φ2) and this voltage is indicated on the meter 32.

Figure 2:
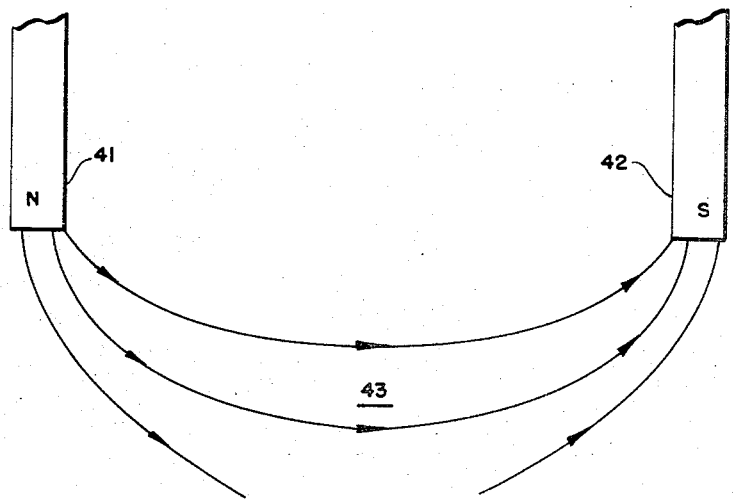
FIG. 2 is a schematic diagram illustrating the normal path of magnetic flux flowing from north and south poles of two parallel bar magnet members.

Referring now to FIG. 2, there is shown schematically a magnetic field of the type found in the region between a pair of magnetic poles. The group of lines of force, taken collectively, represent the flux field and, as is well known in the art, the lines of force, or the flux field, become less dense the further one progresses from any particular magnetic pole. In FIG. 1, magnetic north pole 41 and south pole 42 create a flux field generally designated by the reference numeral 43 and represented by the flux lines as they pass from the magnetic pole 41 to a magnetic south pole 42. The flux field projects outwardly from all points on the pole surfaces and, as represented by the flux lines, it becomes somewhat weaker the further one progresses from the pole surfaces.

Figure 3:
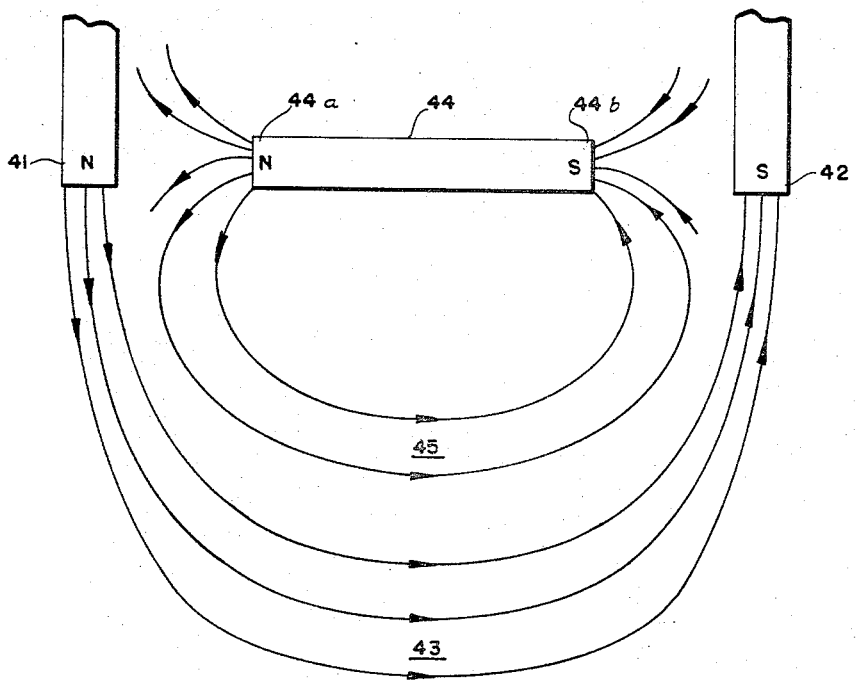
FIG. 3 is a schematic diagram of the magnetic flux lines of force when a bar magnet is disposed in the air gap between the pair of magnetic poles of FIG. 2.

FIG. 3 illustrates the same pole or bar magnet members 41 and 42 having their poles separated by a gap similar to that shown in FIG. 2 but having an additional magnetic source or magnetic bar member 44 positioned between the poles 41 and 42. The north pole 44a of bar magnet 44 is contiguous to or adjacent north pole 41 and south pole 44b of bar magnet 44 is contiguous to or adjacent the south pole 42. Since the fields of like magnetic poles repel one another, the magnet 44 and its associated flux fields 45, functions to beam the magnetic flux lines 43, emanating from the pole members 41 and 42, downwardly and causes them to travel over an elongated and more circuitous path, thus, the flux field 43 actually travels over a greater length or path than in the arrangement of FIG. 2. This action increases the air gap reluctance between the poles 41 and 42. It therefore causes the flux field 43, due to the poles 41 and 42, to be stronger at a greater distance from the pole tips 41 and 42 than in the configuration illustrated in FIG. 2.

As will be seen in FIG. 1, the above principle is applied to the magnetic metal detector of the present invention. More specifically, magnetic bar member 44 is inserted into the air gap 10 with its north pole 44a respectively positioned closely adjacent contiguous with north pole 9a of bar member 9 and with south pole 44b positioned relatively close to the south pole 8a of the bar member 8. Magnetic bar member 44 may be supported within the gap 10 in any well known manner, such as by means of a bracket of magnetically impermeable material or may be embedded in a plastic encapsulation which holds the respective members in their relative positions. This arrangement causes the flux lines of force emanating from poles 8a and 9a of the second loop to travel over a more circuitous or longer path and to be stronger at a greater distance from the magnetic detection device, or from poles 8a and 9a, than would normally be the case were it not for the presence of the bar member 44.

The presence of the bar magnet 44 increases the reluctance of the air gap 10 because the flux field actually follows a more circuitous route between pole faces 8a and 9a. In actual operation, it is important to understand that the presence of magnet 44 not only beams the magnetic flux field emanating from the poles 8a and 9a, for a greater distance outwardly toward a magnetic body, such as body 36, but it also changes the nature of the magnetic flux field so that the rod 36 is actually in a higher density field.

In order to ascertain the orientation of a longitudinal member such as the rod 36 or a pipe under a cement or earth surface, the apparatus is merely rotated about an axis passing between the north and south pole ends 9a and 8a. As the poles 8a and 9a become aligned with the rod or pipe, the meter 32 gives a maximum output indication. Furthermore, by translationally moving the detection device, the exact position of the rod can be located beneath a covering nonmagnetic material. Because the gap 10 is substantially great and the north and south poles or ends 9a and 8a respectively of the device are widely separated, the device is especially sensitive in determination of the orientation of longitudinal members.

While the illustrated embodiment is the preferable structure, it will be understood that the members 8 and 9 may be formed in other configurations and still provide an extremely sensitive magnetic material detection device. For example, the members 8 and 9 could be made straight instead of L-shaped with their north and south poles 8b and 9b respectively abutting the ends 4a and 6a of the legs of the first loop. In such an instance the separation between the north and south pole ends 8a and 9a of the second loop would not be as great and the gap 10 would be substantially less. In such an instance, magnet member 44 would be of an appropriate length. While the device would still operate to indicate the relative position of magnetically detectable bodies, it would be somewhat less sensitive to the particular orientation of longitudinal bodies.

By the present invention there has been provided an improved magnetic metal detector using a Hall effect generating device for measuring the changes in flux field due to the presence of a body of magnetic material. While permanent magnets 3, 8, 9 and 44 provide an extremely simple and portable means for producing the flux fields of the respective first and second loops, it will be understood that suitably controlled electromagnetic flux field generating devices can easily be substituted for these permanent magnets in the apparatus.

While in accordance with the patent statutes there has been described what at present is considered to be the preferred embodiment of the invention, it will be understood by those skilled in the art that various changes and modifications may be made therein without departing from the invention, and it is, therefore, the aim of the appended claims to cover all such changes and modifications as fall within the true spirit and scope of the invention.

What is claimed is:

1. Apparatus for detecting the presence of a body of magnetic material comprising:

a magnetic bridge circuit including a plurality of magnetically permeable bar members arranged in a first magnetic loop and a second magnetic loop, said second loop including at least two magnet members, the north pole of one and the south pole of the other being bridged by an air gap, said air gap of said second loop creating a greater magnetic reluctance in said second magnetic loop than the magnetic reluctance of said first magnetic loop, said first and second loops including at least one magnetically permeable bar member forming a common flux path for said respective loops;

means for inducing magnetic flux fields in said respective loops, said flux field through said common flux path due to said first magnetic loop being equal in magnitude but opposite in direction to the normal flux field through said common path due to said second magnetic loop so that the normal effective flux field in said common path is zero;

a Hall voltage generator positioned in said flux field of said common path, said Hall generator including means for applying a control current thereto and Hall voltage output terminals;

a magnet member supported in said air gap separating the north and south poles of said magnet members of said second loop, said magnet member in said air gap having its north and south poles contiguous with the respective north and south poles of said bar members of said second loop thereby causing the effective flux field through said air gap to take a more circuitous path from one pole to the other of said second loop than would be the case in the absence of said magnet member; and means connecting to said Hall voltage terminals for indicating a voltage output from said Hall generator when a body of magnetic material is disposed in the vicinity of said air gap in said second magnetic loop thereby reducing the reluctance of said second magnetic loop and producing a corresponding increase in the flux field magnitude through said common path and a Hall voltage output corresponding to the relative position of said body of magnetic material with respect to said air gap in said second magnetic loop.

2. Apparatus for detecting the presence of a body of magnetic material comprising:

a magnetic bridge circuit including a plurality of interconnected magnetically permeable bar members arranged in a first magnetic loop and a second magnetic loop, said second loop having at least a pair of spaced apart magnetic bar members extending outwardly from one side of said first loop, said one side of said first loop forming a common flux path for both said first and second loops, said two bar magnetic members of said second loop having the south pole of one member and the north pole of the other member bridged by an air gap thereby creating a greater magnetic reluctance in said second magnetic loop than the magnetic reluctance in said first magnetic loop;

means for inducing a flux field in said first magnetic loop, said means permitting adjustment of the magnitude and direction of the flux field in said first magnetic loop so that said flux field in said first magnetic loop is substantially equal in magnitude and opposite in direction to the flux field in said common flux path resulting from said second magnetic loop thereby making a normal effective flux field through said common path equal to zero;

a Hall voltage generator positioned in said flux field of said common path, said voltage generator including means for applying a control current thereto and Hall voltage output terminals;

a permanent bar magnet member supported in said air gap bridging said north and south poles of said magnetic bar members of said second loop, said permanent magnet member having its north and south poles contiguous with but separated from the respective north and south poles of said bar magnetic members bridged by said air gap of said second loop thereby causing the effective flux field through said air gap to take a more circuitous path from one pole to the other of said second loop than would be the case in the absence of said magnet member; and means connecting to said Hall voltage terminals for indicating a voltage output from said Hall generator when a body of magnetic material is disposed in the vicinity of said gap in said second magnetic loop thereby reducing the reluctance of said second magnetic loop and producing a corresponding increase in the flux field magnitude through said common path and a Hall voltage output corresponding to the relative position of said body of magnetic material with respect to said air gap in said second magnetic loop.

3. Apparatus for detecting the presence of a body of magnetic material comprising:

a magnetic bridge circuit including a first magnetic loop formed of at least one permanent magnet member and a plurality of interconnected ferromagnetic members arranged in a magnetic loop, said ferromagnetic members being formed of material having high magnetic permeability but low retentivity;

a second magnetic loop including at least one ferromagnetic member that is common to both said first and second magnetic loops, said second loop including a pair of permanent magnet members with the north pole of one and the south pole of the other bridged by an air gap, said air gap creating a greater magnetic reluctance in said second magnetic loop than the magnetic reluctance of said first magnetic loop, said magnetic members of said respective magnetic loops being so constructed and arranged as to produce flux fields that are substantially equal in magnitude and opposite in direction through said ferromagnetic member that is common to both of said magnetic loops thereby making the normal effective flux field in said common member substantially equal to zero;

a Hall voltage generator positioned in said flux field of said common member, said Hall voltage generator including means for applying a control current thereto and Hall voltage output terminals;

a permanent bar magnet member supported in said air gap bridging said north and south poles of said pair of permanent magnet members of said second loop, said permanent bar magnet member in said air gap having its north and south poles disposed in juxtaposed relation adjacent said respective north and south poles of said pair of permanent magnet members of said second loop thereby causing the effective flux field through said air gap to follow a more circuitous path from one pole to the other of said second loop than would be the case in the absence of said permanent bar magnet member; and means connecting to said Hall voltage terminals for indicating a voltage output from said Hall generator when a body of magnetic material is disposed in the vicinity of said gap in said second magnetic loop thereby reducing the reluctance of said second magnetic loop and producing a corresponding increase in the flux field magnitude through said common path and a Hall voltage output corresponding to the relative position of said body of magnetic material with respect to said gap in said second magnetic loop.

References Cited

UNITED STATES PATENTS 3,060,370  10/1962  Varterasian _____ 324—45

FOREIGN PATENTS 949,593  2/1964  Great Britain.

RUDOLPH V. ROLINEC, *Primary Examiner.*

WALTER L. CARLSON, *Examiner.*

R. J. CORCORAN, *Assistant Examiner.*